US005210534A

United States Patent [19]

Janex

[11] Patent Number: 5,210,534

[45] Date of Patent: May 11, 1993

[54] ENCODING METHOD FOR ANTI-COLLISION SYSTEM FOR SEA NAVIGATION

[75] Inventor: Albert Janex, Cachan, France

[73] Assignee: Thomson-CSF, Puteaux, France

[21] Appl. No.: 682,950

[22] Filed: Apr. 10, 1991

[30] Foreign Application Priority Data

Apr. 27, 1990 [FR] France ........................ 90 05396

[51] Int. Cl.[5] ........................ G01S 13/00

[52] U.S. Cl. ........................ 340/984; 340/961; 342/41; 342/455; 364/461

[58] Field of Search ........................ 340/984, 985, 961; 364/461; 342/455, 29, 41, 30

[56] References Cited

U.S. PATENT DOCUMENTS

| | | | |
|---|---|---|---|
| 3,717,873 | 2/1973 | Riggs | 342/41 |
| 3,755,811 | 8/1973 | Breckman | 342/30 |
| 3,806,922 | 4/1974 | Isbister | 342/41 |
| 4,014,004 | 3/1977 | Fuller . | |
| 4,835,537 | 5/1989 | Manion | 340/961 |
| 4,914,733 | 4/1990 | Gralnick | 364/461 |

FOREIGN PATENT DOCUMENTS

| | | | |
|---|---|---|---|
| 0074865 | 3/1983 | European Pat. Off. . | |
| 0154018 | 9/1985 | European Pat. Off. . | |
| 2601168 | 1/1988 | France . | |
| WO8806385 | 8/1988 | PCT Int'l Appl. . | |
| 8800379 | 1/1988 | World Int. Prop. O. | 340/984 |

OTHER PUBLICATIONS

"Oceans '90" Conference held in early 1990, Concept of a Collision-Avoidance System for Marine Navigation, A. Janex, Scientific Director, LMT Radio Professionnelle-BP 402, F92103 Boulogne-Billancourt, France, pp. 1-6.

*Primary Examiner*—Jin F. Ng
*Assistant Examiner*—Brent A. Swarthout
*Attorney, Agent, or Firm*—Oblon, Spivak, McClelland, Maier & Neustadt

[57] ABSTRACT

The disclosed system has, for each equipped ship, a transmitter that repetitively transmits the geographical coordinates, speed and course of its own ship. Furthermore, it transmits an identification code of any nature serving as an address for the exchange of messages. If it wishes to make concerted arrangements with other surrounding ships in order to perform maneuvers, it sends encoded messages taken out of a glossary.

10 Claims, 1 Drawing Sheet

ENCODING METHOD FOR ANTI-COLLISION SYSTEM FOR SEA NAVIGATION

BACKGROUND OF THE INVENTION

The present invention relates to an encoding method for an anti-collision system for sea navigation.

A known anti-collision system for sea navigation is described in the French patent application No. 2 601 168. Each ship fitted out with this system has a transmitter repetitively transmitting a message containing, in particular, information on the geographical coordinates, the speed and the course of its own ship, and a receiver connected to the display device displaying, in particular in the form of symbols, homologous information received from other similarly equipped ships.

Such a system greatly facilitates the maneuvers performed by ships, especially in zones with a high density of obstacles (other ships, buoys, jetties etc.).

This known system also provides for the inclusion, in the transmitted messages, of the identification code of the ship with which communication is to be undertaken. This ship is automatically alerted as soon as its receiver picks up the message. The operators of these two ships can then communicate by telephone links, for example to coordinate their maneuvers. However, a telephone link such as this has drawbacks: the radio-frequencies available for such links are often very busy and even saturated. Moreover, operators rarely speak the same language.

Besides, in this known system, the messages also include the identity of the sender ship. The identity code is a sequence of binary elements, one part of which is used for the definition of the type of ship (petrol tanker, ferry, cargo ship etc.) while the other part is used to identify the sender ship without ambiguity. It is enough that this other part should be long enough for one and only one user ship in the world to be made to correspond to its binary content. It is enough to have a glossary to trace the code back to its corresponding user.

However, a possibility of biunique correspondence such as this between a code and a user may have one drawback. For a variety of reasons, (confidentiality, business competition, etc.), certain potential users of the system would not like their whereabouts to be known. The above-mentioned identification method may induce them to refrain from using their instruments, thus depriving other nearby ships of the advantages of the system. Moreover, the complexity of the task of preparing a glossary on a worldwide scale may be so cumbersome as to hamper the adoption of the system.

SUMMARY OF THE INVENTION

An object of the invention is an anti-collision system of the above-mentioned type by which two ships fitted out with it, that have expressed a wish to conduct a conversation, can do so without inconvenience, even when using busy connection lines, and can do so with a high level of intelligibility even when they speak the same language, this system ensuring a minimum of confidentiality to users who desire it.

According to the method of the invention, encoded message are sent when contact is set up between at least two user ships, these messages forming part of a glossary at the disposal of all the users in their own languages, the glossary containing messages liable to be exchanged among ships. In particular, these messages are words and/or phrases necessary for the different maneuvers that may be performed by ships.

Advantageously, the encoded messages further include an identification code, of any nature whatsoever, used as an address for the exchange of messages. To prevent any ambiguity in the event of at least two ships close to each other having the same identification code, it is provided, according to the invention, that as soon as a multiple use of this type is detected, it is reported to the users concerned so that at least one of them changes its code.

According to another aspect of the invention, to reduce or eliminate the risks of the multiple use of one and the same identification code, there is provision for the use of codes of sufficient length and for the inclusion therein of a distinctive part that is automatically generated by the system. This distinctive part may be generated by a pseudo-random memory.

BRIEF DESCRIPTION OF THE DRAWING

The present invention shall be understood more clearly from the following detailed description of an embodiment, taken as a non-restrictive example and illustrated by the appended drawing, in which.

DETAILED DESCRIPTION OF THE INVENTION

Each ship taking part in the anti-collision system of the invention is equipped with a device such as the one shown schematically in FIG. 1, and shall hereinafter be called an "equipped ship".

Figure 1:
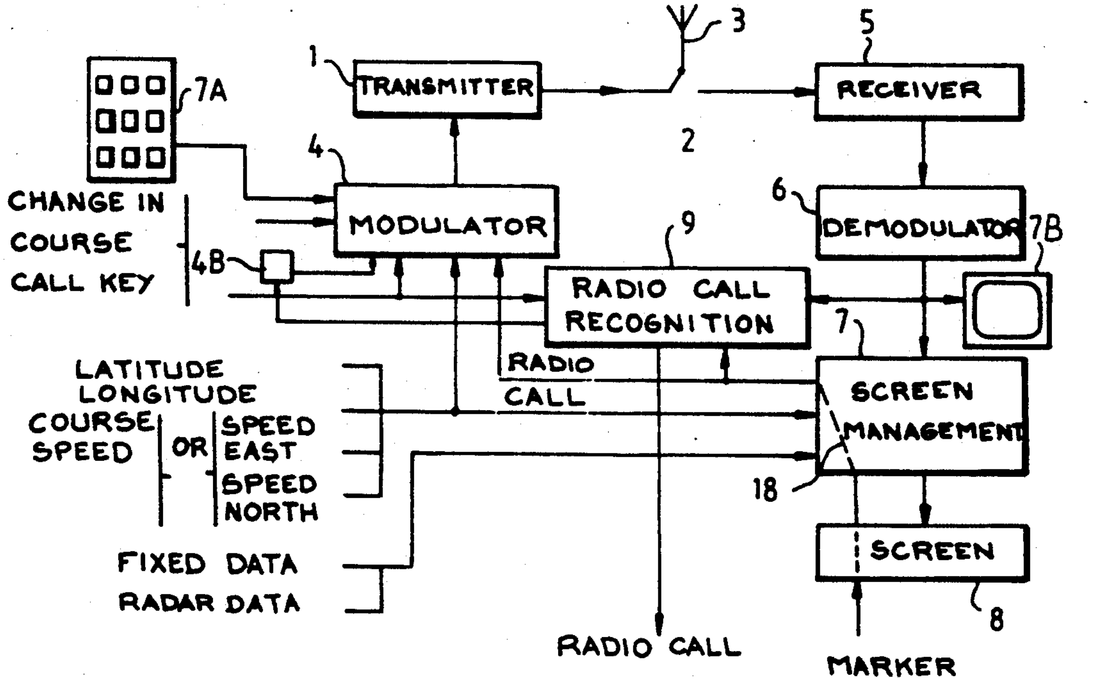
FIG. 1 is a block diagram of a device installed in a ship and forming part of the system according to the invention.

The device shown in FIG. 1 has a transmitter 1 transmitting messages discontinuously with a mean load rate (defined as the ratio between the duration of the transmission-on period and the duration of the transmission-off period that is very low, of the order of $10^{-4}$ to $10^{-5}$. The power and frequency of transmission are chosen so as to limit the range of the transmitter 1 to some tens of kilometers. The limitation may be that due to the earth's curvature if the transmission frequency chosen is one with line-of-sight propagation, for example if it is a frequency of the UHF band (several hundreds of MHz) or beyond it, without however going beyond the X band so that the propagation is practically unaffected by meteorological conditions. The frequency $F_o$ of the transmitter is the same for all the transmitters and receivers of the system.

The transmitter 1 is connected, through a switch 2, to an antenna 3 so as to provide for omnidirectional transmission in the horizontal plane.

The transmitter 1 is also connected to a modulator 4. This modulator 4 prepares a binary "word" assembling all the information to be transmitted and transposes it into a signal modulating the transmitter 1. The form of modulation is of the pulse type so as to provide for the total absence of transmission outside the period during which the message is transmitted. However, the specific type of modulation of information used is not dictated by the method of the invention: each binary element may be encoded according to any of the known encoding techniques, for example pulse position keying or phase leap keying.

The message transmitted has the following elements of information:

the ship's coordinates, preferably in latitude and in longitude, encoded for example in twenty-two binary elements each. These coordinates are given by the ship's radionavigation system. Ships are generally equipped with radionavigation instruments that constantly give them their absolute geographical position with precision and reliability. The precision required by the anti-collision method of the invention is of the order of 100 meters. For example, the radionavigation system known as NAVSTAR meets these conditions.

the ship's speed and course: these items of information are generally available on all ships, at least in analog form. All that has to be done is to convert them into digital form. These items of information can be encoded with sufficient precision by six and eight binary elements respectively.

if necessary (if this is laid down by the standards), the change in course, encoded by two binary elements representing "turn to portside" or "turn to starboard side". Such an item of information can be given automatically by any known indicator of rotational direction which is activated as soon as the maneuver starts. The standards may also provide for information that is ampler and given further in advance rather than for a mere indication of a change in course, namely it may provide for information on the value of the future course. However, this would require the information to be entered by hand (on a keyboard) and would entail a risk of oversight on the part of the operator.

A call key or identification code is described in greater detail here below.

Advantageously, these items of information are preceded, according to a standard technique used in message transmission, by a preamble enabling certain circuits of the receiver to be initialized. Again, advantageously, these items of information are complemented by binary elements constituting an end-of-message symbol and, if the permanent repetition of the messages is deemed to be insufficient to eliminate all errors, binary elements for the correction of errors (parity binary elements for example) may be added.

As specified here above, if the ship is equipped with a NAVSTAR type radionavigation receiver, such a receiver gives most of the above-mentioned information with a level of precision that is far greater than that needed by the system of the invention. In this case, for each item of information, the superfluous, less significant binary elements may be overlooked, the only binary elements kept being those considered to be significant and to have the precision necessary and sufficient for the implementation of the method of the invention as specified here above. Thus the length of the transmitted message is about a hundred binary elements at least. If the passband allocated to the system is in the range of some megahertz, the message is transmitted in some tens of microseconds.

If each equipped ship sends a message such as this with a periodicity of about one second, the traffic load set up in the system by a ship is between $10^{-4}$ and $10^{-5}$. If, for example, about a hundred ships are present simultaneously in a same geographic zone (such as a port), the traffic load of the system is only $10^{-2}$ to $10^{-3}$. This ensures a high probability that these messages will not interfere with each other. And even here it must be pointed out that a relatively unfavorable case has been been taken since the order of magnitude of the maneuvering time needed for the ships to avoid each other is far greater than one second, and that the message repetition period could be greatly increased, thus reducing the probability of their interfering with each other.

Advantageously, the instant of transmission of each message is randomized, since mutual interference remains possible owing to the non-synchronization of the transmissions of the different ships. Thus, for the above-mentioned example of a repetition period of one second, this value will have only a mean statistical value, and the true period will have a wide spread assigned to it. The result thereof will be that any garbled message received from a given ship will not be lastingly garbled. Furthermore, the high redundancy of the messages sent (for a periodicity of about one second, one and the same message is repeated several times before a significant change in course and/or speed and/or geographical position) enables the message received in a garbled state to be overlooked.

Outside the short periods of transmission by the transmitter, the inverter 2 connects the antenna 3 to a receiver 5 locked into the common frequency of the system. The receiver 5 is connected to a data demodulator 6 extracting the information from the signal received by carrying out operations that are the reverse of those carried out in the modulator 4. This modulator is also connected to a data-introduction device 7A such as a keyboard.

The demodulator 6 is connected via a screen management unit 7 to a display screen 8. The elements 7 and 8 may be, for example, a microcomputer and its display monitor. These elements 7 and 8 may be complemented by a device 7B for the display of the identification code of one or more surrounding ships.

Figure 2:
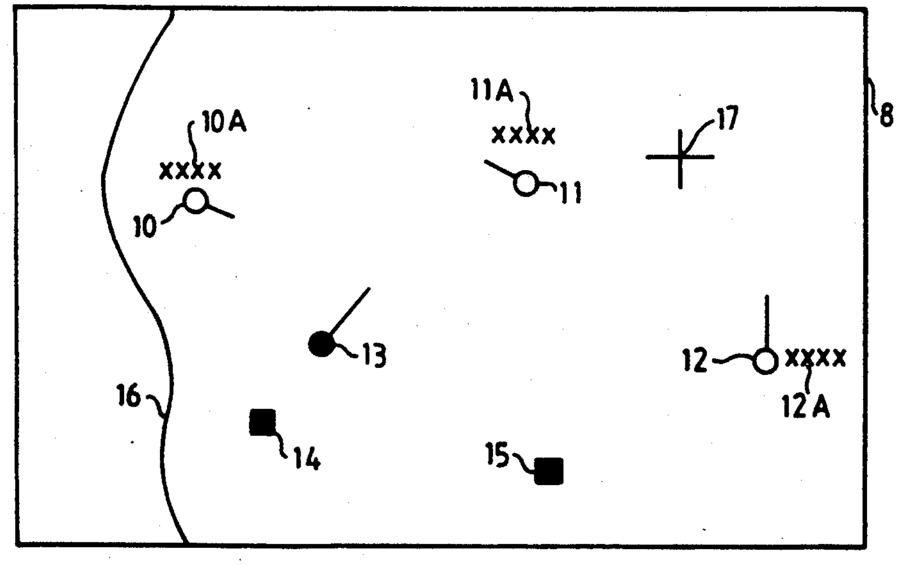
- FIG. 2 is a plane view showing an exemplary screen of the display device of the equipment of FIG. 1.

The screen 8 is aimed at showing an operator the entire environment of his ship by the use of information received from the surrounding equipped ships, as well as information received from his own instruments. FIG. 2 shows a non-restrictive example of information that can be displayed on the screen 8. This information can be displayed in a way similar to that of the screen of a panoramic radar.

According to the example of FIG. 2, the screen 8 displays the different ships (10, 11, 12 for example) in the form of big dots of light, while its own ship (referenced 13) is displayed in a color and/or a luminosity that is different from that of the other ships. Besides, different shapes and/or colors of dots may correspond to different types of ships. Each dot representing a ship has an extension formed by a straight line segment representing the speed vector of the corresponding ship. The length of this vector is proportional to the speed of the ship, and its direction corresponds to the course of this ship. Advantageously, there can also be a particular symbol, for example a dot or a line with a different color, used to represent the information on the change in course near the information on the speed vector, to its left or to its right depending on the direction of the change. The general presentation of the screen 8 may be done by locating the north at the top of the screen but it is also possible, advantageously, to make the top of the screen correspond to the ship's prow, the lubber line of this ship being then fixed. The speed vector of each ship may correspond to an absolute speed or else, according to one variant, to a relative speed in relation to that of the ship 13 (whose own speed vector is then null), the different relative speed vectors of the other ships being then determined by the vector summing of their own speed and of the speed of the ship 13. The dot representing the ship 13 may equally well be located at the center of the screen rather than being off-centered in a direction opposite its speed vector to favor the "frontward view".

Advantageously, near the dot representing each other ship (10, 11, 12 in FIG. 2) its identification code (10A, 11A, 12A respectively) is displayed.

Again advantageously, each equipped ship has a radar enabling it to detect the surrounding ships that are unequipped or have their equipment out of order, as well as fixed obstacles (rocks, coast etc.). FIG. 2 shows two echoes 14, 15, representing unequipped ships as well as the outline 16 of a coast. The echos 14, 15 are preferably displayed in a shape and/or color that are different from those of the dots 10 to 13 so that the operator immediately notices that they correspond to ships that are unequipped or have their equipment out of order and that the absence of the corresponding speed vector does not mean that these ships are at zero speed.

All the transforms of coordinates, vectors and, as the case may be, of information coming from the onboard radar are carried out, in a manner known per se, by the management element 7, the making of which will be clear to those skilled in the art from a reading of the present invention.

Furthermore, fixed data stored in a mass memory may also be given to the management unit 7. Cartographic data such as data on coastlines, buoys, lighthouses etc. can also be displayed on the screen.

According to an advantageous variant of the invention, a set of ship's equipment also includes a radio call recognition circuit 9 connected, firstly, to the output of the demodulator 6 and, secondly, to a data entering keyboard (which is not shown but whose function may be fulfilled by 4A) on which the operator keys in the call key (which is in fact, advantageously, an identification code as described here below) of the ship with which he wishes to make contact. This call key is also sent to the modulator 4 and is incorporated in the message periodically transmitted by the transmitter 1. The circuit 9 may also be a simple comparator that, in the called ship, compares the call key received from the calling ship with its own call key and, in the event of equality, sets off a sound and/or visual alarm. Naturally, the message received by the called ship contains the call key of the calling ship. This call key may be displayed on the screen 8 of the called ship. This display be may be done for example in uncoded form (in the form of an alphanumerical call key) in a corner of this screen. According to an advantageous variant, instead of this display or, in addition to this display, a symbol may appear in the vicinity of the dot (for example one of the dots 10 to 12) that represents the calling ship, or else this dot itself may be modified. The symbol may be, for example, a circle surrounding the dot representing the calling ship and/or this dot may blink or appear in an overbright state.

According to another variant of the invention, the screen management unit 7 is associated with a "mouse" type device commonly used with microcomputers. This device will produce a movable marker 17, cross-shaped for example, on the screen 8. When this marker is overlaid on the symbol representing a ship that the operator wishes to call by radio, this operator handles the click button of the mouse. This command is processed by the unit 7 which produces a corresponding call key (symbolized by the dashed line 18) and sends it to the modulator 4. To produce this call key, the unit 7 memorizes the call keys received from all the neighboring ships (displayed on the screen 8), establishes a relationship between the point at which the marker 17 has stopped and the corresponding call key and sends this call key. The setting up of these functions performed by the unit 7 is obvious to those skilled in the art and shall therefore not be described in greater detail. Clearly, in the called ship, the "mouse" may be used to acknowledge the call and, if necessary, to trigger a radio link. The use of the "mouse" prevents possible errors, in both ships (the calling ship and the called ship), due to any wrong entering of a call key by the keyboard.

By means of this mouse or of the keyboard 4A, the operator on a ship may enter and/or modify his ship's "identification code".

This identification code may be any code. It is not necessarily taken out of a glossary, and does not enable its user to be really identified. This code is a binary number with no meaning, serving merely as an address in the exchange of messages as described in detail here below.

However, it may advantageously be configured as follows:

- some of the binary elements of this number may be assigned to the identification of the type of ship. Such information is useful for the organization of concerted maneuvers by ships close to one another.
- one of the binary elements of the number may be used to indicate whether the code is taken from a glossary (some ships may wish to have their identity known or, at any rate, may have no reason to conceal their identity) or whether it has no inherent meaning.
- the rest of the code, if it is not taken from a glossary, has a number of binary elements, for example about 16 binary elements, sufficient for the probability of the use, by coincidence, of two identical codes in a same zone to be negligible.
- according to a first variant, the choice of the rest of the code is left to the user's wish. However, such an approach may have drawbacks: for example, it may permit the ill-intentioned use of another user's code, and the more frequent use of certain simplified codes increasing the risk of coincidence of two codes in a same geographic zone.
- according to a second advantageous variant, the choice of the rest of the code is done independently by a processor 4B, connected to the modulator 4 and to the circuit 9. This processor 4B may generate a pseudo-random sequence when it is put into operation.
- if the lasting identification of the user is to be avoided, the processor 4B may periodically change the pseudo-random sequence. The processor may make this change in a period of inactivity (with the absence of all reception during a large number of successive periods).
- naturally, if the processor 4B detects a coincidental use by another user (by detection through the circuit 9) of the code sent by its transmitter 1, it may activate the immediate changing of its code or, at least, of the pseudo-random sequence that it prepares.

When communication is set up between two ships, and when each of them has received, from the other one, the message described in detail in FIG. 2, enabling the display of the corresponding data on the screen 8, these ships may exchange other types of messages advantageously replacing a telephone link. These other types of messages may concern, in particular, the maneuvering intentions of these two ships. To reduce the space occupied by the transmission channel and to facilitate the understanding of these messages, they are encoded according to a glossary containing the list of the usual messages (words and/or phrases) for all the possible cases of maneuvering such as: intention of staying on course, of turning to portside or starboard side, waiting for a tug, equipment out of order etc. Naturally, each ship's operator has the translation of the glossary in his own language. Provision may also be made for a code for "requesting telephone transmission" in those cases, of relatively low probability, where at least one of the operators has to send a message that is not in the glossary. The frequency to be used for this telephone link may also be indicated. Naturally, three or more ships may participate at the same time in this exchange of encoded messages: owing to their brevity (for example, they may comprise only eight binary elements to encode 256 different messages), there is little risk of simultaneity of transmission by several ships. To reduce these risks of simultaneity, the messages may be repeated several times, at randomly determined intervals.

The codes of the encoded messages may be displayed on the monitor 7B or on the screen 8. According to an advantageous variant, the translation of these codes into uncoded form is displayed by means of a character generator the making of which is obvious to those skilled in the art. In the same way, to prevent the need for leafing through a glossary, the keyboard 4A may be replaced by a display device, for example of the pop-up menu or icon type, displaying all the messages available, grouped according to types of messages. An indicator device, for example of the "mouse" operated type, enables the activation of the desired message and the dispatch of the corresponding message immediately thereafter.

What is claimed is:

1. An anti-collision system for sea navigation, wherein each ship implementing said system comprises:

transmitting means for repetitively transmitting, on a channel common to all ships implementing said system, information comprising data pertaining to the ship's geographic position, course and speed, and an identification code, said identification code being changeable for preventing a unique identification of each ship and having a distinctive portion automatically generated by the system;

receiving means for receiving homologous information from surrounding ships implementing said system; and display means for displaying the received homologous information by symbols on a panoramic type screen.

2. The anti-collision system according to claim 1, wherein each ship implementing said system further comprises:

detecting means for detecting if a second ship has an identification code identical to its identification code.

3. The anti-collision system according to claim 1, wherein the distinctive portion is automatically generated by a pseudo-random generator.

4. The anti-collision system according to claim 1, wherein the identification code includes an identification of the type of ship.

5. The anti-collision system according to claim 1, wherein the identification code includes an element indicating whether the identification code is taken out of a glossary.

6. The anti-collision system according to claim 1, wherein the distinctive portion of the identification code is changed periodically.

7. The anti-collision system according to claim 6, wherein the change takes place during a period of inactivity when no homologous information is received.

8. The anti-collision system according to claim 1, wherein said information further comprises data encoded messages, forming part of a glossary at the disposal of all ships implementing the system, in their own language, said glossary containing messages liable to be exchanged among ships.

9. The anti-collision system according to claim 8, wherein the messages of the glossary include words or phrases necessary for indicating different maneuvers that may be carried out by the ships.

10. The anti-collision system according to claim 8, wherein the messages of the glossary are repeated several times, at randomly determined intervals.

* * * * *